3,061,521
GLUTAMIC ACID FERMENTATION
Winfred N. McCutchan and Phil H. Hidy, both of Terre Haute, Ind., assignors to Commercial Solvents Corporation, New York, N.Y., a corporation of Maryland
No Drawing. Filed Nov. 15, 1961, Ser. No. 152,628
8 Claims. (Cl. 195—47)

Our invention relates to the utilization of waste carbohydrate materials obtained in the enzymatic hydrolysis of grain or starch. More particularly, our invention relates to the utilization of enzymatic hydrol, the waste residual material from the enzymatic hydrolysis processes of the grain sugar industry, as a source of carbohydrate in the production of glutamic acid by fermentation, utilizing the organism *Brevibacterium divaricatum*.

Enzymatic hydrol comprises the molasses obtained as the residual mother liquor from the enzymatic hydrolysis of starch or grain from which sugar has been crystallized. This material contains about 80% solids, the major portion of which is comprised of dextrose. However, substantial proportions of other types of carbohydrates are present. A typical analysis of enzymatic hydrol, as usually obtained in the open market, is the following:

TABLE I

| | Percent |
|---|---|
| Solids | 79.8 |
| Ash | 1.7 |
| Hydrolyzable carbohydrate | 71.8 |
| Dextrose equivalent (of non-ash solids) | 75.1 |
| Dextrose equivalent equals 100%: | |
|     Dextrose | 64.1% |
|     Maltose | 7.0% |
|     Trisaccharides | 6.4% |
|     Tetrasaccharides and higher | 22.5% |
| Water | 20 |

Different samples of enzymatic hydrol may vary considerably from the figures shown above, but this analysis illustrates, in general, the type of material under consideration. Enzymatic hydrol is a relatively new product derived from relatively new processes for hydrolyzing grain or starch utilizing enzymes instead of the acids utilized by older processes. Ever since its availability, and since it is available in relatively large quantities, many attempts have been made to utilize it as a carbohydrate source in commercial fermentations in view of its high carbohydrate content.

One of the areas of fermentation where attempts to utilize enzymatic hydrol have been made is in the fermentation production of glutamic acid by glutamic acid-producing strains of the organism *Brevibacterium divaricatum*. However, up to the present time, no successful method has been devised for producing glutamic acid by fermentation in desirably high yields while utilizing enzymatic hydrol as the carbohydrate source. Since the enzymatic hydrol is obtained as a product of enzymatic hydrolysis, it was thought to be improbable that further hydrolysis would have any beneficial effect, and it was further believed that any slight changes that would occur would not have any material effect upon the yields of the fermentation.

We have now made the surprising discovery that if the enzymatic hydrol is subjected to ordinary acid hydrolysis, the yield of glutamic acid in the subsequent fermentation process is greatly increased. Our new process, therefore, represents an improvement over previous methods for the production of glutamic acid by fermentation using glutamic-acid producing strains of the organism *Brevibacterium divaricatum* by allowing the use of easily obtainable and economical materials in the fermentation medium.

The method for the production of glutamic acid utilizing hydrolyzed enzymatic hydrol as a carbohydrate source also utilizes a nitrogen source, a phosphate source, a potassium source, trace amounts of mineral salts, and glutamic-acid producing strains of the organism *Brevibacterium divaricatum*. The method is well-described in U.S. Patent No. 2,978,383, issued on April 4, 1961, and U.S. Patent No. 2,978,384, issued on April 4, 1961, to Koichi Yamada. Briefly, the process for the production of glutamic acid involves incubating a glutamic-acid producing strain of the organism *Brevibacterium divaricatum* in an aqueous nutrient medium, the said medium containing the abovementioned nutrients. The fermentation is preferably carried out at temperatures ranging from about 28 to about 31° C. under submerged conditions of agitation and aeration. In addition to hydrolyzed enzymatic hydrol as the carbohydrate in the nutrient media, the nutrient media utilized also require the presence of a nitrogen source in either organic or inorganic form such as urea, ammonium chloride, ammonium sulfate, etc. A source of potassium and phosphorous such as dipotassium phosphate is required for suitable yields, as are trace minerals containing such minerals as manganese, magnesium, iron, etc., in compounds such as magnesium sulfate, ferrous sulfate, manganese sulfate, etc. In carrying out the process of our invention, we prefer to maintain the fermentation medium at a pH ranging from about 6 to about 9 during the entire fermentation period, which ordinarily is completed within two or three days time when conducted under aerated conditions.

Hydrolyzed enzymatic hydrol is prepared by the acid hydrolysis of enzymatic hydrol. This hydrol is available in large quantities and can be produced as a by-product of starch hydrolysis in the production of dextrose. The starch is given a mild hydrolysis with acid to liquefy the starch to a form that the enzyme can attack and the pH is adjusted prior to the addition of the enzyme. An enzyme which can be used is beta-amalyse produced by fermentation utilizing the organism *Aspergillus niger*.

The acid hydrolysis of the enzymatic hydrol may be carried out in any known manner, but it is preferable not to unduly prolong the heating in order to prevent caramelization of the sugar. A suitable method of hydrolysis is to autoclave a dilute solution of enzymatic hydrol under pressure in the presence of dilute acid. Most acids can be used and common acids such as hydrochloric acid, sulfuric acid, and nitric acid are quite satisfactory. Relatively small amounts of acid are needed. Successful hydrolyzations have been carried out with acid concentrations as low as .065 N. We have found it necessary to use inert vessels, such as glass or glass-lined vessels, in order to prevent the poisoning of the fermentations in which the hydrolyzed enzymatic hydrol is to be used. This is necessary because it is believed that the dilute acid attacks the sides of the vessels which are not inert and thereby brings into solution, undesirable metallic ions which poison the fermentation. It is desirable to keep the autoclave residence time to a minimum because it is believed that hydroxymethylfurfural is produced under prolonged autoclaving conditions. Hydroxymethylfurfural is believed also to be toxic to the organism in the glutamic acid fermentation. Therefore, hydrolyses have been attempted with autoclave residence times as low as ten minutes with good results. Temperatures in the autoclave of about 155° C. with equivalent hydrol solution temperatures of about 150° C. have been found to give very satisfactory results.

The following examples are offerded to illustrate our invention; however, we do not intend to be limited by them. Rather, we intend to include within the scope of our invention, all equivalents obvious to those skilled in the art.

Example I

To 181 grams of enzymatic hydrol were added 5.3 milliliters of concentrated hydrochloric acid (37%) and enough water to make 1,000 milliliters. The resulting solution was .065 N and was put in a 2-liter flask. The solution was calculated to contain 13% by weight of hydrolyzable carbohydrates and upon assay was found to contain 14% by weight of total carbohydrates. The flask containing the solution was then autoclaved for ten minutes at a temperature of 158° C. and pressure of about 80 pounds per square inch. After the above hydrolyzation, the solution was found to contain 13.1% by weight sugars that reduced a Fehling's solution. A 385-milliliter portion of the above solution was then mixed with 4 grams urea, 0.5 gram $K_2HPO_4$, 0.25 gram $MgSO_4 \cdot 7H_2O$, 0.5 gram autolyzed yeast, 1 milliliter $MnSO_4$ solution (4 p.p.m. of total solution), 1 milliliter $FeSO_4$ solution (4 p.p.m. of total solution), and enough water and ammonia to make a 500-milliliter solution with a pH of 7. This resulting solution was then sterilized for 15 minutes at 10 pounds per square inch pressure and 20-milliliter portions were put in sterile 500-milliliter flasks. After sterilization, the flask was inoculated with 1 milliliter (5%) of a 16-hour inoculant culture prepared as described in Example II. The flask was incubated with the temperature maintained at 29–31° C. throughout the fermentation and the pH maintained at 7.0 for the first 30 hours of the fermentation with urea. The flask was agitated throughout the fermentation. Assays revealed 31.6 grams of glutamic acid per liter of fermentation medium after 24 hours of fermentation and 42.5 grams of glutamic acid per liter of fermentation medium after 48 hours of fermentation.

Example II

An inoculant culture was prepared by combining 20 grams cerelose, 4 grams urea, 0.5 gram $K_2HPO_4$, 0.25 gram $MgSO_4 \cdot 7H_2O$, 1 gram autolyzed yeast, enough water and $NH_4OH$ to make 500 milliliters of medium with a pH of 7.3. Of the above medium, 60 milliliter portions were put into flasks and sterilized for 15 minutes at 10 pounds per square inch pressure. Each flask was inoculated with one loopful from a culture of *Brevibacterium divaricatum* NRRL B-2312. These flasks were then incubated for about 16 hours at 29–31° C. with aeration and agitation. Portions of this inoculant medium were used to inoculate fermentation media.

Example III

To 279 grams of enzymatic hydrol were added 5.3 milliliters of concentrated hydrochloric acid (37%) and enough water to make 1,000 milliliters. The resulting solution was .065 N and was put in a 2-liter flask. The solution was calculated to contain 20% by weight of hydrolyzable carbohydrates and was assayed at 21.6% by weight of total carbohydrates. The flask containing the solution was then autoclaved for 20 minutes at a temperature of 153° C. and at a pressure of 60 pounds per square inch. After the above hydrolyzation, it was found to contain 21.4% by weight sugars that reduced a Fehling's solution. A 385-milliliter portion of the above solution was then mixed with 4 grams urea, 0.5 gram $K_2HPO_4$, 0.2 gram $MgSO_4 \cdot 7H_2O$, 0.5 gram autolyzed yeast, 1 milliliter $MnSO_4$ solution (4 p.p.m. of total solution), 1 milliliter $FeSO_4$ solution (4 p.p.m. of total solution), and enough water and ammonia to make a 500-milliliter solution with a pH of 7. This resulting solution was then sterilized for 15 minutes at ten pounds per square inch pressure and 20-milliliter portions were put in sterile 500-milliliter flasks. After sterilization, the flask was inoculated with 1 milliliter (5%) of a 16-hour inoculant medium prepared as described in Example II. The flask was then allowed to incubate with the temperature maintained at 29–31° C. throughout the fermentation and the pH maintained at 7.0 for the first 30 hours of the fermentation with urea. The flask was agitated throughout the fermentation. Assays revealed 26.2 grams of glutamic acid per liter of fermentation medium after 24 hours of fermentation and 41.5 grams of glutamic acid per liter of fermentation medium after 48 hours of fermentation.

Example IV

To 181 grams of enzymatic hydrol were added 5.3 milliliters of concentrated hydrochloric acid (37%) and enough water to make 1,000 milliliters. The resulting solution was .065 N and was put in a 2-liter flask. The solution was calculated to contain 13% by weight of hydrolyzable carbohydrate and was assayed at 15.5% by weight of total carbohydrates. The flask containing the solution was then autoclaved for five minutes at a temperature of 158° C. and pressure of about 80 pounds per square inch. After the above hydrolyzation, it was found to contain 11.6% by weight, sugars that reduced a Fehling's solution. A 385-milliliter portion of the above solution was then mixed with 4 grams urea, 0.5 gram $K_2HPO_4$, 0.25 gram $MgSO_4 \cdot 7H_2O$, 0.5 gram autolyzed yeast, 1 milliliter $MnSO_4$ solution (4 p.p.m. of total solution), 1 milliliter $FeSO_4$ solution (4 p.p.m. of total solution), and enough water and ammonia to make a 500-milliliter solution with a pH of 7. This resulting solution was then sterilized for 15 minutes at 10 pounds per square inch pressure and 20-milliliter portions were put in sterile 500-milliliter flasks. After sterilizations, the flask was inoculated with 1 milliliter (5%) of a 16-hour inoculant culture prepared as described in Example II. The flask was then allowed to incubate with the temperature maintained at 29–31° C. throughout the fermentation and the pH maintained at 7.0 for the first 30 hours of the fermentation with urea. The flask was agitated throughout the fermentation. Assays revealed 30.3 grams of glutamic acid per liter of fermentation medium after 24 hours of fermentation and 35.6 grams of glutamic acid per liter of fermentation medium after 48 hours of fermentation.

Example V

To 348 grams of enzymatic hydrol were added 5.3 milliliters of concentrated hydrochloric acid (37%) and enough water to make 1,000 milliliters. The resulting solution was .065 N and was put in a 2-liter flask. The solution was calculated to contain 25% by weight of hydrolyzable carbohydrate and was assayed at 28.8% by weight of total carbohydrates. The flask containing the solution was then autoclaved for 12.5 minutes at a temperature of 153° C. and pressure of about 65 pounds per square inch. After the above hydrolyzation it was found to contain 25.4% by weight sugars that reduced a Fehling's solution. A 385-milliliter portion of the above solution was then mixed with 4 grams urea, 0.5 gram $K_2HPO_4$, 0.25 gram $MgSO_4 \cdot 7H_2O$, 0.5 gram autolyzed yeast, 1 milliliter $MnSO_4$ solution (4 p.p.m. of total solution), 1 milliliter $FeSO_4$ solution (4 p.p.m. of total solution), and enough water and ammonia to make a 500-milliliter solution with a pH of 7. This resulting solution was then sterilized for 15 minutes at 10 pounds per square inch pressure and 20-milliliter portions were put in sterile 500-milliliter flasks. After sterilization, the flask was inoculated with 1 milliliter (5%) of a 16-hour inoculant medium prepared as described in Example II. The flask was then allowed to incubate with the temperature maintained at 29–31° C. throughout the fermentation and the pH maintained at 7.0 for the first 30 hours of the fermentation, with urea. The flask was agitated throughout the fermentation. Assays revealed 31.0 grams of glutamic acid per liter of fermentation medium after 24 hours of fermentation and 38.0 grams of glutamic acid per liter of fermentation medium after 48 hours of fermentation.

Example VI

To 279 grams of enzymatic hydrol were added 1.8 milliliters of concentrated sulfuric acid (96%) and enough water to make 1,000 milliliters. The resulting solution was .065 N and was put in a 2-liter flask. The solution was calculated to contain 20% by weight of hydrolyzable carbohydrates and upon assay was found to contain 23% by weight of total carbohydrates. The flask containing the solution was then autoclaved for 15 minutes at a temperature of 156° C. and pressure of about 65 pounds per square inch. After the above hydrolyzation, the solution was found to contain 20% by weight sugars that reduced a Fehling's solution. A 250-milliliter portion of the above solution was then mixed with 4 grams urea, 0.5 gram $K_2HPO_4$, 0.25 gram $MgSO_4 \cdot 7H_2O$, 0.5 gram autolyzed yeast, 1 milliliter $MnSO_4$ solution (4 p.p.m. of total solution), 1 milliliter $FeSO_4$ solution (4 p.p.m. of total solution), and enough water and ammonia to make a 500-milliliter solution with a pH of 7. This resulting solution was then sterilized for 15 minutes at 10 pounds per square inch pressure and 20-milliliter portions were put in sterile 500-milliliter flasks. After sterilization the flask was inoculated with 1 milliliter (5%) of a 16-hour inoculant culture prepared as described in Example II. The flask was then incubated with the temperature maintained at 29–31° C. throughout the fermentation and the pH maintained at 7.0 for the first 30 hours of the fermentation, with urea. The flask was agitated throughout the fermentation. Assays revealed 31.8 grams of glutamic acid per liter of fermentation medium after 24 hours of fermentation and 41.3 grams of glutamic acid per liter of fermentation medium after 48 hours of fermentation.

Example VII

To 186 grams of enzymatic hydrol were added 6.05 milliliters of concentrated nitric acid (70%) and enough water to make 1,000 milliliters. The resulting solution was 0.1 N and was put in a 2-liter flask. The solution was calculated to contain 13% by weight of hydrolyzable carbohydrates and upon assay was found to contain 15% by weight of total carbohydrates. The flask containing the solution was then autoclaved for 2 hours at a temperature of 124° C. and pressure of about 18 pounds per square inch. After the above hydrolyzation, the solution was found to contain 13.1% by weight sugars that reduced a Fehling's solution. A 385-milliliter portion of the above solution was then mixed with 4 grams urea, 0.5 gram $K_2HPO_4$, 0.25 gram $MgSO_4 \cdot 7H_2O$, 0.5 gram autolyzed yeast, 1 milliliter $MnSO_4$ solution (4 p.p.m. of total solution), 1 milliliter $FeSO_4$ (4 p.p.m. of total solution), and enough water and ammonia to make a 500-milliliter solution with a pH of 7. This resulting solution was then sterilized for 15 minutes at 10 pounds per square inch pressure and 20 milliliter portions were put in sterile 500-milliliter flasks. After sterilization the flask was inoculated with 1 milliliter (5%) of a 16-hour inoculant culture prepared as described in Example II. The flask was incubated with the temperature maintained at 29–31° C. throughout the fermentation and the pH maintained at 7.0 for the first 30 hours of the fermentation with urea. The flask was agitated throughout the fermentation. Assays revealed 26.1 grams of glutamic acid per liter of fermentation medium after 24 hours of fermentation and 38.8 grams of glutamic acid per liter of fermentation medium after 48 hours of fermentation.

Now having described our invention, what we claim is:

1. A process for the production of glutamic acid which comprises cultivating a glutamic acid producing strain of the organism *Brevibacterium divaricatum* in an aqueous nutrient medium containing acid hydrolyzed enzymatic hydrol.

2. A process for the production of glutamic acid which comprises cultivating a glutamic acid producing strain of the organism *Brevibacterium divaricatum* in a fermentation medium comprising acid hydrolyzed enzymatic hydrol, a nitrogen source, a phosphate source, a potassium source, and trace amounts of mineral salts.

3. A process for the production of glutamic acid which comprises cultivating a glutamic acid producing strain of the organism *Brevibacterium divaricatum* in a fermentation medium comprising a carbohydrate source at least part of which is composed of acid hydrolyzed enzymatic hydrol, a nitrogen source, a phosphate source, a potassium source, and trace amounts of mineral salts.

4. A process for the production of glutamic acid which comprises cultivating a glutamic acid producing strain of the organism *Brevibacterium divaricatum* in a fermentation medium containing acid hydrolyzed enzymatic hydrol produced by hydrolyzing enzymatic hydrol under elevated temperatures and pressures in a dilute mineral acid medium.

5. The process of claim 4 wherein the mineral acid is selected from the group consisting of hydrochloric acid, nitric acid, and sulfuric acid.

6. The process of claim 4 wherein the mineral acid is hydrochloric acid.

7. The process of claim 4 wherein the mineral acid is nitric acid.

8. The process of claim 4 wherein the mineral acid is sulfuric acid.

No references cited.